United States Patent [19]
Chou et al.

[11] Patent Number: 5,209,828
[45] Date of Patent: May 11, 1993

[54] SYSTEM FOR CONCENTRATING A SPENT CAUSTIC STREAM

[75] Inventors: Tai-Sheng Chou, Pennington, N.J.; Manuel Gonzalez, Newtown, Pa.

[73] Assignee: Mobil Oil Corporation, Fairfax, Va.

[21] Appl. No.: 812,313

[22] Filed: Dec. 23, 1991

[51] Int. Cl.$^5$ .......................... B01D 3/06; B01D 3/10
[52] U.S. Cl. ...................... 203/88; 159/2.1; 159/47.1; 159/DIG. 8; 159/DIG. 16; 159/DIG. 34; 159/DIG. 37; 159/2.3; 202/202; 202/205; 203/25; 203/94; 203/98; 203/DIG. 8; 203/DIG. 14; 423/183; 423/204
[58] Field of Search ...................... 203/88, 12, 94, 14, 203/98, 25, DIG. 8, DIG. 14, DIG. 9; 159/DIG. 34, DIG. 37, 2.1, 2.3, DIG. 16, 47.1, DIG. 8; 202/202, 205; 423/183, 204; 208/235, 263, 361, 364; 196/114

[56] References Cited

U.S. PATENT DOCUMENTS

| | | | |
|---|---|---|---|
| 1,883,211 | 10/1932 | Wilson | 159/DIG. 34 |
| 2,022,037 | 11/1935 | Hanchett | 159/DIG. 34 |
| 2,562,495 | 7/1951 | Hulme | 159/DIG. 34 |
| 2,631,926 | 3/1953 | Eckstrom | 159/DIG. 34 |
| 3,216,796 | 11/1965 | Robbins et al. | 159/DIG. 34 |
| 3,332,470 | 7/1967 | Chirico et al. | 159/DIG. 34 |
| 3,380,806 | 4/1968 | Bradburg et al. | 159/DIG. 34 |
| 3,963,424 | 6/1976 | Bella, Jr. | 159/DIG. 34 |
| 4,441,958 | 4/1984 | Teucci | 159/2.3 |
| 4,783,242 | 11/1988 | Robbins | 203/87 |

FOREIGN PATENT DOCUMENTS 0507749  11/1954  Canada ................. 159/DIG. 34

*Primary Examiner*—Virginia Manoharan
*Attorney, Agent, or Firm*—Alexander J. McKillop; Dennis P. Santini; Malcolm D. Keen

[57] ABSTRACT

A system and method of concentrating spent caustic at a refinery has a multi-stage flash drum for separating a spent caustic stream into an overhead output stream including vaporized water and volatile organic compounds, and a concentrated spent caustic output stream. The system also has a condenser for condensing the overhead output stream, and a separator for separating the condensed overhead output stream into a volatile organic compound stream, a liquid hydrocarbon stream and a water stream. The system further has an ejector for applying a vacuum to the flash drum to vaporize the spent caustic stream at a reduced temperature, and to the separator to remove the volatile organic compound stream. The volatile organic compounds are removed from the overhead of the separator through the ejector to a burner of a fired heater.

16 Claims, 1 Drawing Sheet

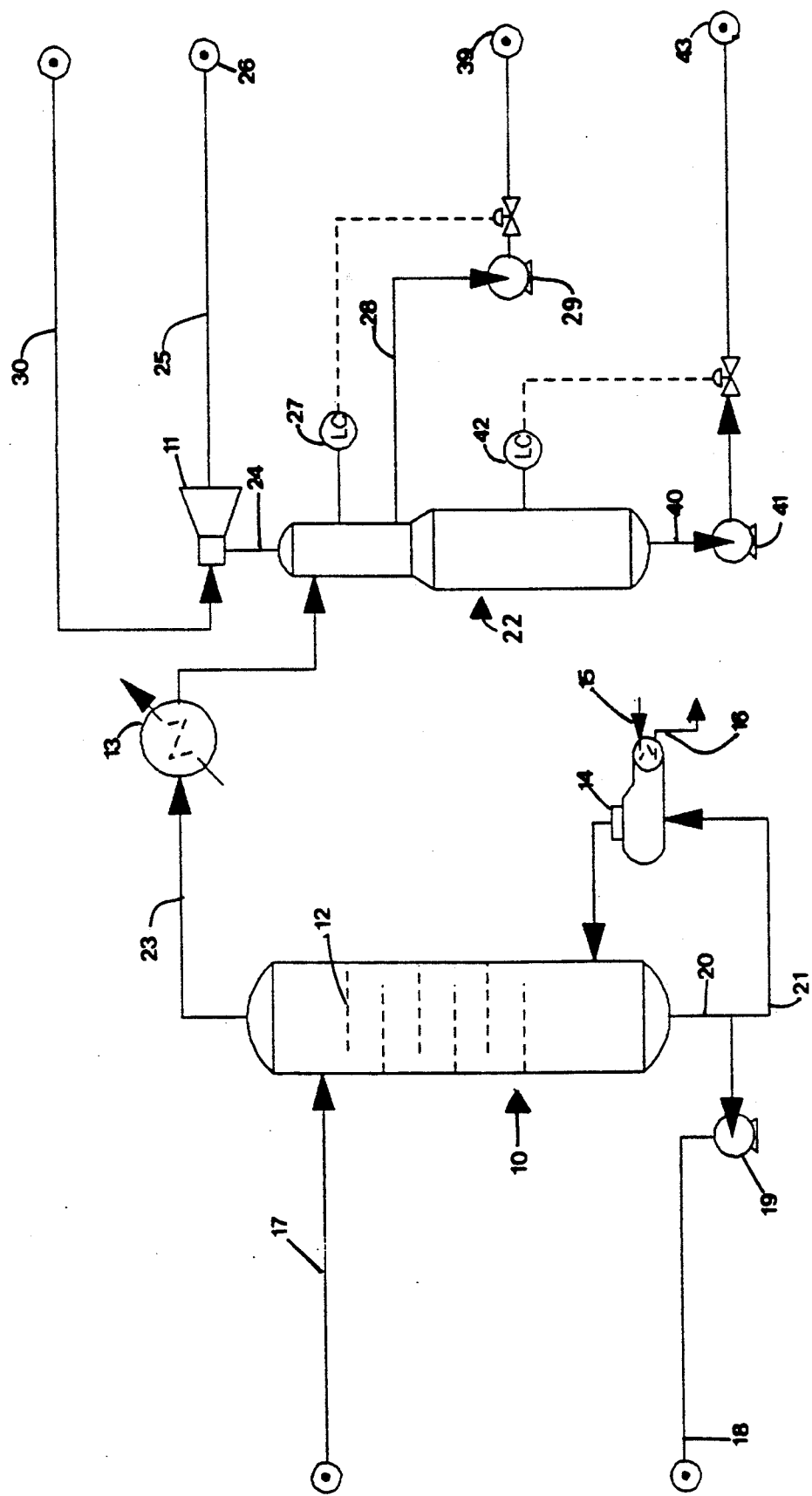

SYSTEM FOR CONCENTRATING A SPENT CAUSTIC STREAM

BACKGROUND OF THE INVENTION

1. Field of the Invention

The present invention relates to a system and a method of concentrating a spent caustic stream at a chemical facility. More particularly, the present invention relates to the removal of water and volatile organic compounds including mercaptans from a spent caustic stream at a refinery.

2. Description of Prior Art

A caustic stream at a chemical facility such as a refinery may be a 3-15% solution of sodium hydroxide in water. Caustic streams are used to treat other streams to remove unwanted compounds such as chloride, fluoride and hydrogen sulfide from gasoline or LPG streams. When the concentration of the sodium hydroxide decreases to about 1%, the stream is treated as a spent stream. A spent caustic stream is disposed of because of the large quantity of compounds, e.g. other sodium compounds, it has acquired while treating other streams. One method of disposal is to feed the spent caustic stream to an incinerator.

It is known to concentrate a spent caustic stream at a refinery by feeding the stream to a flash drum, wherein vaporized water is removed from the overhead of the flash drum and condensed for further treating in a sewer treatment plant. Concentrated spent caustic is then pumped from the flash drum to a spent caustic incinerator. Such concentration scheme decreases the throughput of the incinerator. However, the vaporization mechanism in the flash drum also boils off volatile organic compounds (VOC's) including trace quantities of mercaptans. These VOC's entrained with the water sent to the sewer treatment plant can generate a very strong objectionable odor of mercaptans in the sewer plant.

Typically, the flash drum effluent of the concentrated spent caustic may be at a temperature of about 100° C. This hot concentrated caustic stream also contains hydrocarbons, such as gasoline and kerosine, which raises the possibility of ignition of the hydrocarbons and resultant heating of the piping on the way to the caustic incinerator.

SUMMARY OF THE INVENTION

It is an object of the present invention to separate volatile organic compounds from the water stream to the sewer plant and thereby avoid the mercaptan odor. It is also an object of the present invention to reduce the operational temperature of the flash drum to avoid the possibility of an ignition problem associated with hydrocarbons in the hot spent caustic to the incinerator.

In accordance with the present invention there is provided a system for concentrating spent caustic at a chemical facility such as a refinery comprising a flash drum, preferable a multi-stage flash drum, for separating a spent caustic stream into at least an overhead output stream including vaporized water and volatile organic compounds, and a concentrated spent caustic output stream. The system also includes means for condensing the overhead output stream, and means for separating the condensed overhead output stream into at least a volatile organic compound stream and a water stream. The system further includes means for applying a vacuum to the flash drum to vaporize the spent caustic stream at a reduced temperature, and to the separating means to remove the volatile organic compound stream. The separating means may also provide a liquid hydrocarbon stream. The vacuum applying means preferably is an ejector.

In accordance with another broad aspect of the present invention there is provided a method of concentrating spent caustic at a chemical facility such as a refinery comprising the steps of using a flash drum, preferable a multi-stage flash drum, to separate a spent caustic stream into at least (1) an overhead output stream including vaporized water and volatile organic compounds, and (2) a concentrated spent caustic output stream. The overhead output stream is condensed, and the condensed overhead output stream is separated in a separator into at least a water stream and a volatile organic compound stream. The method also provides for applying a vacuum (1) to the flash drum to vaporize the spent caustic stream at a reduced temperature, and (2) to the separator to remove the volatile organic compound stream. The separator also may provide a liquid hydrocarbon stream.

Thus, the system and method of concentrating spent caustic in accordance with the present invention permits the elimination of VOC's, for example mercaptans, from water which is typically sent to a sewer plant. Further, the use of a vacuum ejector to apply a vacuum to the flash drum provides for a reduced operational temperature in the caustic concentration tower to thereby avoid any possibility of an ignition problem associated with hydrocarbons in the spent caustic stream to the incinerator. Still further, liquid hydrocarbon entrained with the caustic can also be partially recovered and used as a fuel for the chemical facility.

DESCRIPTION OF THE DRAWING

The Figure is a schematic flow diagram of a spent caustic concentration plant in accordance with an embodiment of the present invention.

DESCRIPTION OF SPECIFIC EMBODIMENTS

With reference to the Figure, a spent caustic stream 17 is introduced to the top tray 12 of a caustic concentration tower 10 in the form of a multi-stage flash drum having in this instance six trays shown in dashed lines. A thermo-siphon reboiler 14 uses steam 15 as the heating medium, and has an exiting condensate stream 16. The reboiler 14 provides enthalpy required to boil off water and volatile hydrocarbon compounds by generation of hot vapor and bringing such vapor into contact with the cascading spent caustic liquid stream in the tower 10. The overhead vapor stream 23 includes water, volatile hydrocarbon compounds and other volatile organic compounds (VOC's). The overhead vapor stream 23 is fed to a condenser 13 which condenses the vapor stream and feeds it to a recovery vessel 22 which is designed to separate condensed streams into various products by gravity.

An ejector 11 is driven by a medium pressure steam line 30 to apply vacuum to the caustic concentration tower 10 and to the recovery vessel 22. The ejector 11 is connected to and applies a vacuum pressure of less than 20 KPaa, preferably less than 10 KPaa, to the recovery vessel 22 and at a pressure of less than 34 kPaa, preferably less than 24 kPaa, to the multi-stage flash drum. The ejector 11 is able to apply vacuum to the caustic concentration tower 10 because there is a small pressure drop across the condenser 13. In a specific embodiment of the invention to be described hereinafter, this pressure drop is less than 14 KPaa.

As a result of the vacuum being applied to the caustic concentration tower 10 by the ejector 11, the caustic concentration tower 10 is able to vaporize the spent caustic stream 17 at a substantially reduced temperature. This reduction in concentration tower pressure decreases the temperature of the concentrated caustic exiting the caustic concentration tower 10 at the bottom thereof by line 18 to preferably less than 65° C., and decreases the temperature of overhead stream 23 to preferably less than 60° C. The concentrated caustic stream 18 passes through a pump 19 and to a spent caustic incinerator 18. A portion of the concentrated caustic stream 18 is recycled via line 21 through the reboiler 14 and to the tower 10.

VOC's, for example light mercaptans, are removed from the top 24 of the recovery vessel 22 for VOC control or may be directed by line 25 to the burner of a fired heater 26. This line 25 to the heater 26 may also include gaseous hydrocarbons. The recovery vessel 22 also provides a liquid hydrocarbon stream 28 which is fed through pump 29 to a fired heater 39.

The recovery vessel 22 provides at its bottom output 40 water which is essentially free of VOC's and hydrocarbons and which is drained from the bottom of the recovery vessel 22 and sent via pump 41 to a sewer treatment plant 43.

The ejector 11 is a well known steam-jet ejector consisting essentially of a steam nozzle which discharges a high-velocity jet across a suction chamber that is connected by line 24 to the recovery vessel 22. The gaseous VOC stream is entrained by the steam and carried into a venturi-shaped diffuser which converts the velocity energy of the steam into pressure energy. As used herein "ejector" also includes those having multiple nozzles and also ejectors connected in series or parallel.

The caustic concentration tower 10 as described hereinabove is a multi-stage flash drum type evaporator wherein the heating medium steam 15 heats the recycle stream 21 which is fed to the bottom of the tower 10 to boil off the overhead vapor stream 23.

The recovery vessel 22 shown in the specific embodiment is a gravity separator which relies primarily upon the force of gravity to disengage entrained material. Such separators are well known in the art and are widely used in refineries. These separators also provide liquid surge volume (Liquid Residence Time). The liquid residence time of the liquid hydrocarbon stream is maintained by liquid level controller 27. Similarly, liquid level controller 42 controls the residence time of the water stream 40.

A computer simulation of the system shown in the Figure with a single stage flash drum resulted in the data shown in the following table.

TABLE

|  | stream: | | | | |
|---|---|---|---|---|---|
|  | 17 | 20 | 23 | 40 | 24 |
| Temperature, °C.: | 30.0 | 60.8 | 60.8 | 37.5 | 37.5 |
| Pressure, KPaa: | 140.0 | 20.7 | 20.7 | 6.9 | 6.9 |
| Composition, Kg/hr × 10³: | | | | | |
| $H_2O$: | 2.44 | 1.592 | 0.848 | 0.793 | 0.055 |
| NaOH: | 0.05 | 0.05 | 0.0 | 0.0 | 0.0 |
| $Na_2S$: | 0.03 | 0.03 | 0.0 | 0.0 | 0.0 |
| Na-phenol: | 0.004 | 0.004 | 0.0 | 0.0 | 0.0 |
| R-COONa: | 0.04 | 0.04 | 0.0 | 0.0 | 0.0 |
| Gasoline: | 0.004 | 0.0 | 0.004 | 0.0 | 0.004 |

TABLE-continued

|  | stream: | | | | |
|---|---|---|---|---|---|
|  | 17 | 20 | 23 | 40 | 24 |
| Kerosine: | 0.04 | 0.0 | 0.04 | 0.0 | 0.04 |
| Mercaptans: | 0.0003 | 0.0 | 0.0003 | 0.0 | 0.0003 |

Stream 17 is the spent caustic stream fed to the Caustic concentration tower 10. Streams 20 and 23 are the caustic concentration tower's bottom and overhead streams, respectively. Streams 40 and 24 are the recovery vessel's bottom and overhead streams, respectively.

The temperature of the concentrated caustic stream 20 exiting the bottom of the tower 10 is 60.8° C. for a single stage tower used in the simulation. This is a dramatic decrease from the approximate 100° C. stream of the prior art discussed above. It is believed that a tower with six stages as shown in the Figure would result in a further reduction of the temperature of the tower's overhead stream 23 to within the range of 60°14 40° C.

The data shows that the mercaptans were removed from the spent caustic stream 17 in the tower 10, and from the recovery vessel 22 by the overhead VOC stream 24. Gasoline and kerosine were also removed from the spent caustic stream 17 in the tower 10 and recovered in the VOC stream 24 for use as fuel.

While particular embodiments of the invention have been shown and described, various modifications are within the true spirit and scope of the invention. The appended claims are, therefore, intended to cover all such modifications.

What is claimed is:

1. A system for concentrating spent caustic at a chemical facility comprising:
   a multi-stage flash drum for separating a spent caustic stream into at least (1) an overhead output stream including vaporized water and volatile organic compounds, and (2) a concentrated spent caustic output stream;
   means for condensing said overhead output stream;
   means for separating said condensed overhead output stream into at least a volatile organic compound stream, and a water stream;
   means for applying a vacuum (1) to said multi-stage flash drum to vaporize said spent caustic stream at a reduced temperature and (2) to said separating means to remove said volatile organic compound stream;
   means for recycling a portion of said concentrated spent caustic output stream to said multi-stage flash drum; and
   means for heating the recycled portion to provide sufficient heat to maintain the temperature of said concentrated caustic stream at the output of said multi-stage flash drum at less than 65° C., and the temperature of said overhead output stream at less than 60° C.

2. The system of claim 1 wherein said separating means also provides a liquid hydrocarbon stream, and further comprising means for feeding said hydrocarbon stream as fuel to a heater in the chemical facility.

3. The system of claim 1, further comprising means for feeding said water stream to a sewer treatment plant.

4. The system of claim 1, further comprising means for feeding said volatile organic compound stream to a heater in the chemical facility.

5. The system of claim 1, further comprising means for feeding another portion of said concentrated spent caustic output stream to an incinerator.

6. The system of claim 1 wherein said vacuum applying means is an ejector, and wherein said ejector is connected to said separating means downstream of said condensing means.

7. The system of claim 6 wherein said ejector applies the vacuum to said separating means at a pressure of less than 20 KPaa, and to said multi-stage flash drum at a pressure of less than 34 KPaa.

8. The system of claim 7 wherein said ejector applies the vacuum to said separating means at a pressure of less than 10 KPaa, and to said multi-stage flash drum at a pressure of less than 24 KPaa.

9. The system of claim 1 wherein said chemical facility is a refinery.

10. A method of concentrating spent caustic at a chemical facility comprising the steps of:

separating in a multi-stage flash drum a spent caustic stream into at least (1) an overhead output stream including vaporized water and volatile organic compounds, and (2) a concentrated spent caustic output stream;

condensing said overhead output stream;

separating in a vessel said condensed overhead output stream into at least a volatile organic compound stream and a water stream; and applying a vacuum (1) to said multi-stage flash drum to vaporize said spent caustic stream at a reduced temperature, and (2) to said vessel to remove said volatile organic compound stream.

recycling a portion of said concentrated spent caustic output stream to said multi-stage flash drum, and heating the recycled portion to provide sufficient heat to maintain the temperature of said concentrated caustic stream at the output of said multi-stage flash drum at less than 65° C., and the temperature of said overhead output stream at less than 60°.

11. The method of claim 10 wherein said separating step includes providing a liquid hydrocarbon stream, and feeding said hydrocarbon stream as fuel to a heater in the chemical facility.

12. The method of claim 10 further comprising feeding said water stream to a sewer treatment plant.

13. The method of claim 10 further comprising feeding said volatile organic compound stream to a heater in the refinery.

14. The method of claim 10 further comprising feeding said concentrated spent caustic output stream to an incinerator.

15. The method of claim 10 wherein an ejector is used to apply the vacuum to said vessel at a pressure of less than 20 KPaa, and to said multi-stage flash drum through a condenser at a pressure of less than 34 KPaa.

16. The method of claim 15 wherein the vacuum applied to said vessel is less than 10 KPaa, and to said multi-stage flash drum is less than 24 KPaa.

* * * * *